(12) United States Patent
DeMello

(10) Patent No.: US 9,090,151 B2
(45) Date of Patent: Jul. 28, 2015

(54) SYSTEM, METHOD AND APPARATUS FOR PRODUCING WEATHERSTRIP CONTAINING PROFILES OF DIFFERENT SHAPE AND WEATHERSTRIPS FOR USE THEREWITH

(75) Inventor: Alan J. DeMello, Newmarket, NH (US)

(73) Assignee: ULTRAFAB, INC., Farmington, NY (US)

( * ) Notice: Subject to any disclaimer, the term of this patent is extended or adjusted under 35 U.S.C. 154(b) by 898 days.

(21) Appl. No.: 13/199,939

(22) Filed: Sep. 13, 2011

(65) Prior Publication Data

US 2012/0090245 A1    Apr. 19, 2012

Related U.S. Application Data

(60) Provisional application No. 61/403,295, filed on Sep. 13, 2010.

(51) Int. Cl.
*E06B 7/22* (2006.01)
*B60J 10/00* (2006.01)
*E06B 7/16* (2006.01)

(52) U.S. Cl.
CPC .......... *B60J 10/0011* (2013.01); *B60J 10/0065* (2013.01); *E06B 7/16* (2013.01)

(58) Field of Classification Search
CPC .. B60J 10/0011; B60J 10/002; B60J 10/0065; E06B 7/22
USPC ...................................... 49/475.1–500.1, 506
See application file for complete search history.

(56) References Cited

U.S. PATENT DOCUMENTS

| 4,064,654 | A | * | 12/1977 | Olson ......................... 49/489.1 |
| 4,288,482 | A | * | 9/1981 | Beck ............................... 428/92 |
| 4,288,483 | A | * | 9/1981 | Miska et al. .................... 428/92 |
| 4,528,736 | A | | 7/1985 | Hope et al. |
| 4,676,995 | A | * | 6/1987 | Fabris et al. .................. 427/520 |
| 4,720,625 | A | * | 1/1988 | Arney et al. ............... 235/145 R |
| 4,843,701 | A | | 7/1989 | St. Angelo et al. |
| 4,994,311 | A | * | 2/1991 | Junker .......................... 428/122 |
| 5,103,547 | A | | 4/1992 | Holloway et al. |
| 5,348,314 | A | * | 9/1994 | Antonini ...................... 277/551 |
| 5,932,312 | A | * | 8/1999 | Steffen ......................... 428/122 |
| 5,979,036 | A | | 11/1999 | Socci et al. |
| 6,385,833 | B1 | | 5/2002 | Albanese et al. |
| 6,907,696 | B1 | * | 6/2005 | Hutton ......................... 52/204.1 |
| 6,935,072 | B2 | * | 8/2005 | Kogiso et al. ................ 49/490.1 |
| 6,986,930 | B2 | * | 1/2006 | Giles ............................ 428/119 |
| 7,144,543 | B2 | | 12/2006 | Schwaiger et al. |
| RE40,024 | E | * | 1/2008 | Hill ............................... 428/194 |

(Continued)

*Primary Examiner* — Katherine Mitchell
*Assistant Examiner* — Justin Rephann
(74) *Attorney, Agent, or Firm* — Kenneth J. Lukacher Law Group

(57) ABSTRACT

A system to enable operators of extrusion facilities to eliminate the error of installing the incorrect weatherseal in an extrusion or profile. The operators extruding the profiles are provided a list by the fabricator of what weatherseal is to be inserted by placing indicia on the backing of the weatherseal, as by printing the die or profile number on the actual backing of the weatherseal, thereby providing improved weatherseals having unique indicia. The indicia designates the profile which will receive the die. The indicia correlates weatherseal with the profile/die number to confirm that the proper weatherseal is being used. To confirm the correct weatherseal is being used for the profile being produced, all the operator has to do is look at the back of the weatherseal.

7 Claims, 3 Drawing Sheets

(56) References Cited

U.S. PATENT DOCUMENTS

| | | | |
|---|---|---|---|
| 2005/0246963 A1* | 11/2005 | Kogiso et al. | 49/498.1 |
| 2006/0064937 A1* | 3/2006 | Danczek et al. | 49/475.1 |
| 2007/0014966 A1* | 1/2007 | Day et al. | 428/92 |
| 2007/0209313 A1* | 9/2007 | Willett | 52/716.8 |
| 2007/0264466 A1* | 11/2007 | DeMello | 428/89 |
| 2009/0313900 A1* | 12/2009 | Foster | 49/70 |
| 2010/0173148 A1* | 7/2010 | Summerer | 428/332 |
| 2011/0227297 A1* | 9/2011 | Kennedy et al. | 277/640 |
| 2011/0308054 A1 | 12/2011 | Bednarz et al. | |
| 2012/0060424 A1* | 3/2012 | Willett | 49/490.1 |

\* cited by examiner

PILE WEATHERSEAL
IN FINAL POSITION
IN PROFILE

US 9,090,151 B2

SYSTEM, METHOD AND APPARATUS FOR PRODUCING WEATHERSTRIP CONTAINING PROFILES OF DIFFERENT SHAPE AND WEATHERSTRIPS FOR USE THEREWITH

Priority is claimed to U.S. Provisional Application No. 61/403,295, filed Sep. 13, 2010, which is incorporated by reference.

FIELD OF THE INVENTION

The present invention relates to a system (method and apparatus) for producing weatherstrip containing profiles of different shape and weatherstrips for use therewith, where the weatherstrips are identified to correspond to or match each of said different shapes such that the profile contains the proper weatherstrip. By profiles is meant the sections, or lineals which provide the sections, from which windows, doors and other fenestration products are made. Weatherstrips are also called weatherseals.

BACKGROUND OF THE INVENTION

As background for this invention, reference may be had to U.S. Pat. application Ser. No. 12/459,800, filed Jul. 8, 2009, in the names of Zachary Bednarz et al., and assigned to the same assignee as this application, now U.S. Pat. No. 8,307,524, issued Nov. 13, 2012. Reference may be had to corresponding European Patent Application Publication No. EP 2272623, published Jan. 12, 2011. Reference may also be had to U.S. Pat. No. 7,144,543, issued Dec. 5, 2006 to Schwaiger et al.

The present invention results for the appreciation that the growth of windows made from extruded PVC has expanded greatly and now make up over 60% of all windows sold in North America with a total unit count of over 40 million units on an annual basis. Window manufacturers either extrude their own profiles made from PVC (Poly Vinyl Chloride) to produce the profiles needed to make an actual window or they buy the profiles from a extrusion company that provides turn-key programs that provide all the needed profiles also known as shapes. Most window manufacturers or extruders that provide turn-key systems to fabricators have several hundred different dies due to the fact that each company that manufactures windows and specialty doors, like patio doors, have a complete product line comprised of up to a dozen window and door types and all these lines have the ability to be customized with various extruded components to make the window or door adapt to the type of substrate it will be mounted into. The end result is literally hundreds of profiles running in each facility that produces profiles for windows and doors.

A recent trend is to reduce labor and create a better performing window or door is to install the weatherseal during the extrusion process as is described in the above-referenced U.S. patent application Ser. No. 12/459,800. The profile is then cut into lengths and assembled with the weatherseal already in place making for a more cost effective and tighter window design due to the weatherseal being up tight to all corners and edges because it was cut in its final position and it does not have to be inserted into a finished window that would result in someone manually cutting and fitting each piece in place.

So with each extrusion facility having hundreds of dies extruding profiles to be used in windows and doors and with the actual weatherseal insertion operation now being incorporated into this extrusion process there can be a problem due to the fact that the actual fabricator will specify a wide range of weatherseal choices to differentiate or obtain the performance required for their window or door. Pile comes in numerous colors and can come in a range of heights from 0.100" to 0.750". Pile is also produced in a range of densities allowing the window and door fabricator to tweak the operating forces of their products by selecting from a low density weatherseal (lower closing and operating forces) to a very high density weatherseal (higher closing and operating forces). In short, there is an endless number of weatherseals that could be installed in these hundreds of profiles.

The result of all these profiles and weatherseal choices can be confusion and add to this the pace of work and the multi-lingual nature of the work force found in many of these extrusion facilities and a common problem can be the wrong weatherseal being inserted in the wrong profile. This error is costly and if not caught in the extrusion facility several window or doors could be made and reach the market and be installed and not function properly for the consumer either by not operating properly or excessive air and water infiltrating the home, increasing energy costs at a minimum or damaging the interior of the structure at a maximum.

SUMMARY OF THE INVENTION

Briefly described, a method embodying the present invention has the steps of: extruding the profiles with unique shapes correlated to different weatherstrips, printing unique indicia correlated to each profile shape on backing of the weatherstrips, selecting for insertion into each of the profiles after extrusion the weatherstrip having the indicia which correlates with or matches the profiles, and processing the profiles containing the weatherstrips for use in fabricating fenestration and other products.

A system is also provided by the present invention having an extruder with a die providing a profile associated with a unique identifier, and an inserter for inserting a weatherstrip into a slot of the profile in which the unique identifier of the profile matches an identifier printed on the weatherstrip being inserted.

The system in accordance with the invention is especially adapted to enable operators of extrusion facilities to eliminate this potential for error. The operators extruding the profiles are provided a list by the fabricator of what weatherseal is to be inserted into what profile. Each profile is numbered on the prints used by the machine operators and quality personnel. The profile number is also the die number in the majority of the extrusion facilities.

The system in accordance with the invention avoids potential error by placing indicia on the backing of the weatherseal, as by printing the die or profile number on the actual backing of the weatherseal, thereby providing improved weatherseals having unique indicia.

As such, the present invention further embodies an improved weatherstripping having a backing, a sealing member of pile or foam or other compressible material extending from one side of the backing, an indicium corresponding to a profile which provides a frame section when said weatherstripping is assembled therewith. Such indicium is disposed, such as printed, on the side of said backing opposite to said one side.

One advantage is that the profile extrusion operator by looking at the profile or die number (the unique indicia or identifier associated with the profile) stamped on the die (or the profile drawing) determines the actual profile or die number being produced, and then looks at the back of the weatherseal and correlates the printed indicia on the weatherstrip with such profile or die number to confirm that the proper weatherseal at the inserting operation is being or will be used. There is no need to read or cross reference the weatherseal number from the reel label or box, which in some cases it is no longer readable or the box itself has been discarded. All the operator has to do is look at the back of the weatherseal to confirm the correct weatherseal is being used for the profile being produced. If the weatherseal is used in more than one profile, the indicia associated with each of the profiles with which it is used in is printed as a list on the backing of the weatherseal.

Printing can be achieved by pressure, ink jet or any other means that will permanently mark the weatherseal backing. The color of the ink may also be selected to allow for a series of profiles to be even more quickly identified. As an example, Double Hung window profiles can use blue ink printed indicia and Casement window profiles use red ink indicia.

The term indicia herein is used to refer to a profile or die number. It may be considered a series of digits associated with such number, or considered a single indicium. The same indicia is printed on one or more weatherstrips which can be inserted in a profile associated with the indicia. The indicia may include (or instead be provided by) other alphanumeric characters.

BRIEF DESCRIPTION OF THE DRAWINGS

The foregoing and other features and advantages of the invention will become more apparent from a reading of the following description in connection with the accompanying drawings in which.

DETAILED DESCRIPTION OF THE DRAWINGS

Figure 1:
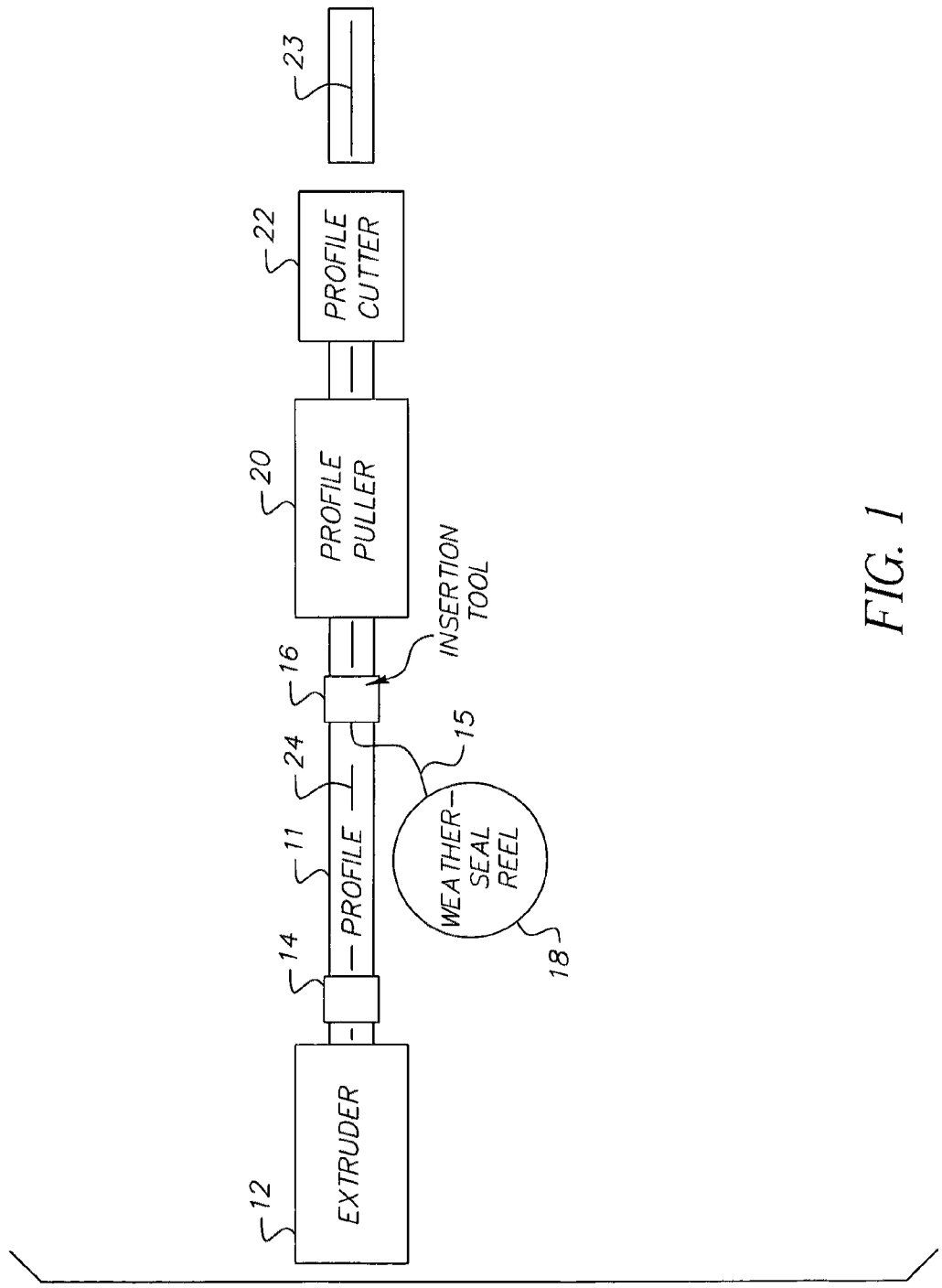
FIG. 1 is a block diagram of a system for producing weatherstrip containing profiles with weatherstrip matched to the profile identified accordingly with indicia corresponding to the profile so that the weatherstrip containing profiles are produced with the desired and matching weatherstrip contained therein.

Referring to FIG. 1 there is shown a system for making, by extrusion, a weatherseal containing profile 11. The system includes an extruder 12 having a die 14 which defines the shape of the profile 11. The shaped profile 11 after it is cooled is processed by an insertion tool or inserter apparatus 16 which receives the weatherstrip 15 (see e.g., FIG. 3) from a reel 18 and inserts weatherstrip (or weatherseal) 15 in the profile's weatherseal retention groove or slot 24 (see e.g., FIG. 4). The extruder 12 and the insertion apparatus 16 may be of the type described in the above-identified U.S. patent application Ser. No. 12/459,800, or in the patents relating to insertion tools which are cited therein, namely Hope et al., U.S. Pat. No. 4,528,736, issued Jul. 16, 1985; St. Angelo et al., U.S. Pat. No. 4,843,701, issued Jul. 4, 1989; Holloway et al., U.S. Pat. No. 5,103,547, issued Apr. 14, 1992; Socci et al., U.S. Pat. No. 5,979,036, issued Nov. 9, 1999; or Albanese et al., U.S. Pat. No. 6,385,833, issued May 14, 2002. For example, the profile may be made of PVC.

Figure 2:
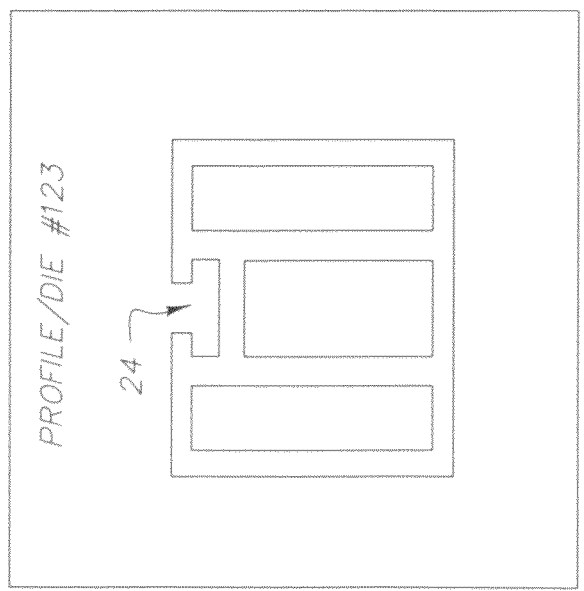
FIG. 2 is a cross-sectional view of the profile die shown in FIG. 1 having an exemplary shape for an exemplary profile which is extruded using the system of FIG. 1.

The die 14 is marked profile/die number 123, or is otherwise associated with die 14, as shown for example in FIG. 2. The die 14 includes a section for shaping the T-slot 24 of the profile which is indicated as #123. The profile die 14 can be replaced with another profile die to extrude different shape profiles having the same or different slot configuration, as desired. Preferably, the profile/die number is stamped into the actual die 14.

The profile 11 with the weatherstrip 15 inserted therein (see e.g., FIG. 4) is driven downstream away from the extruder 12 by a driving and cutting station including a profile puller 20 and profile cutter 22. The cut sections 23 may be dropped in a bin for shipment to the window, door or other fenestration product fabricator. In the example shown in FIG. 3, the radius of weatherstrip's backing 26 is such that it provides ease for insertion at inserter 16.

Figure 3:
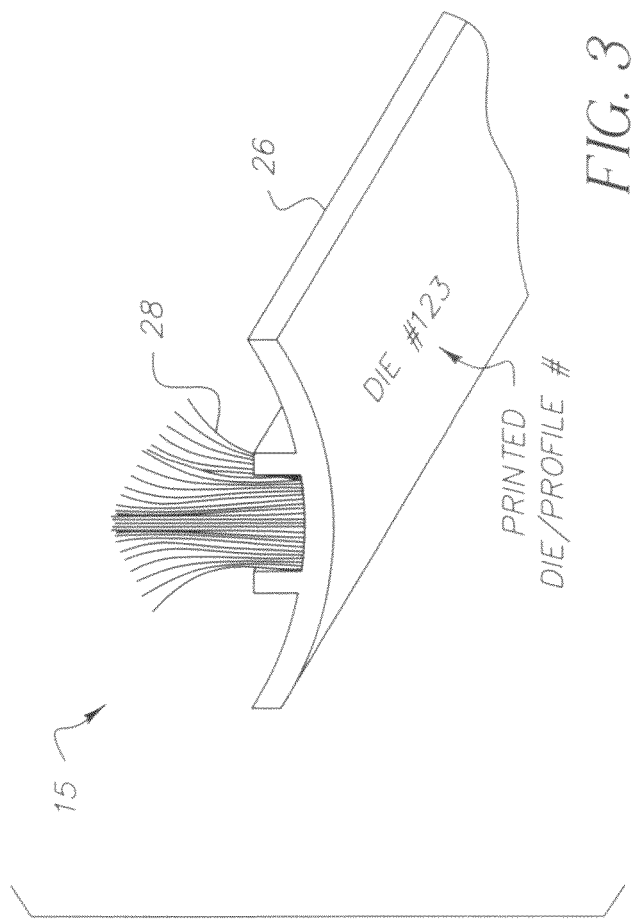
FIG. 3 is a perspective view of an improved weatherseal for use in the system shown in FIG. 1 printed on the outside of the backing thereof with indicia matching the profile or profiles which the weatherstrip matches.

FIG. 3 illustrates a pile weatherstrip of the type shown in the above-referenced Albanese U.S. Pat. No. 6,385,833 or U.S. patent application Ser. No. 12/459,800 having a backing 26 on the outside thereof. The pile seal 28 extends from the inside of the backing 26, that is the side opposite to the outside or bottom of the backing 26. Other types of seals may be used which are connected to a backing, sometimes referred to as a stiffener, when the seal is of the foam type.

The outside of the backing 26 has a printed number representing the unique indicia (or identifier) corresponding to the number associated with the die 14 (and thus profile 11 shaped by such die) being used in the system of FIG. 1. In this example, the printed number is the profile or die number "123" which is printed on the outside of the backing 26. The manner in which the printing is applied may be any suitable way of applying printed matter such as an inked roller, a spray or inkjet printer. Preferably, the printed (or stamped) die number repeats along backing 26 and each are spaced apart for each other as desired. The system may include printing the matching one or more indicia on the backing and particularly the outside thereof so that the one more indicia will be visible when the weatherstripping 15 is wound on the reel 18 (FIG. 1).

If the weatherseal 15 is insertable in the slot 24 of an extruded profile 11 having a particular shape, then repeating unique indicia for that profile 11 will be printed or otherwise marked on the weatherseal's backing when manufactured. However, if the same type of weatherseal 15 is insertable in the slot 24 of more than one extruded profile (each may be of different shape but can accommodate the weatherstrip in their respective slot), the indicia associated with each of the profiles with which the weatherseal is used is printed on the backing 26 of the weatherseal 15 (e.g., a repeating list being printed along the same row, or in multiple rows, as desired). The color of the printed indicia may be black, but other colors maybe selected so long as they contrast with that of the color of backing 26 so as to be easily visible to an operator. Also, the color of printed indicia may differ for different weatherstrips to associated weatherstrips for different types of profiles (e.g., for different types of windows).

Figure 4:
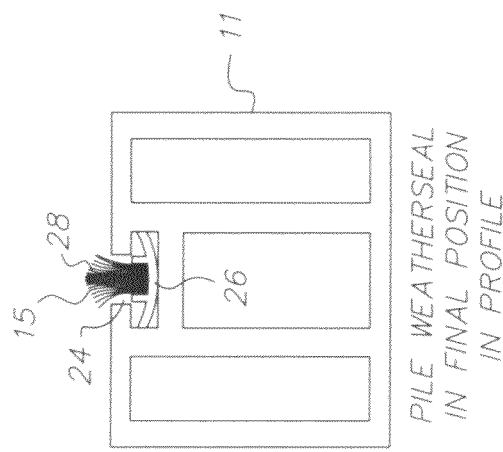
FIG. 4 is a cross-sectional view of the profile with the weatherstrip inserted into the T-slot therein.

FIG. 4 illustrates the profile 11 as it leaves the insertion tool 16 and has the weatherstrip 15 with its backing inserted into the T-slot 24 and the pile 28 extending outwardly from the profile 123.

Figure 5:
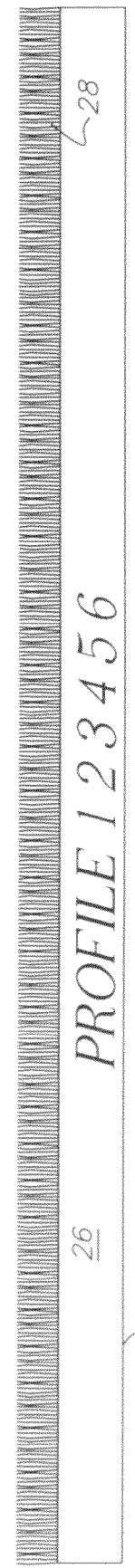
FIG. 5 is a perspective bottom view of a weatherstrip of the type shown in FIG. 3.

The printed indicia may have other graphics or text, such as "PROFILE" shown for example in FIG. 5. FIG. 5 is a view in perspective from the bottom of the weatherstripping 15 showing a different profile number on the outside of the backing with additional digits to the digits shown in FIG. 3.

In summary, the combination of profile 11 and inserted weatherstrip 15 in cut section(s) 23 is assured (verifiable) by an operator or quality personnel matching the profile/die number (or indicia, indicium, or other identifier) stamped on the die 14 with one or more indicia, indicium, or other identifier that are printed on the weatherstrip 15. This is facilitated by the operator or quality personnel reading the weatherstripping's printed profile/die number(s), which faces radially outward with weatherstripping 15 when wound on reel 18, at setup and/or operation of the system of FIG. 1. This correlates the weatherstrip 15 with the profile/die number making the profile 11 to confirm that the proper weatherseal is being used. There is no need to read or cross reference a weatherseal number from the reel label or box, which in some cases it is no longer readable or the box itself has been discarded, which is typically different for any number or other identifier which may be associated with the profile.

Variations and modifications in the herein described method, system and weatherstrips which are used in the system will undoubtedly become apparent to those skilled in the art. Accordingly, the foregoing description should be taken as illustrative and not in a limiting sense.

What is claimed is:

1. An assembly for a product comprising a frame section provided by one of a plurality of different profiles, each of said profiles having a unique identifier, and weatherstripping, said weatherstripping comprising a backing having opposite sides, a sealing member of pile or foam or other compressible material extending from one of said sides of said backing, an indicium matching said unique identifier of said one of said plurality of profiles, and said indicium being disposed on the other of said sides of said backing opposite to said one of said sides.

2. The weatherstripping according to claim 1 wherein said indicium is printed matter on the other of said sides of said backing.

3. The weatherstripping according to claim 1 wherein said indicium is a selected color of a plurality of different colors all of which are visibly perceptible.

4. A method for producing the assembly of claim 1 comprising the steps of:
    extruding the profiles with unique shapes correlated to different weatherstrips;
    printing unique indicia correlated to each profile shape on backing of said weatherstrips;
    selecting for insertion into each of the profiles after extrusion the weatherstrip having the indicia which correlates with or matches the profiles; and
    processing the profiles containing the weatherstrips for use in fabricating fenestration and other products.

5. The method in accordance with claim 1 wherein the weatherstripping is drawn from a reel having said printed indicia facing radially outward with said weatherstripping wound thereon to present said indicia visibly to an operator of said system.

6. A system providing the assembly of claim 1 comprising:
    an extruder having a die providing a profile associated with a unique identifier and having a slot; and
    an inserter for inserting a weatherstrip into the slot of said profile in which the unique identifier of the profile matches an identifier printed on said weatherstrip being inserted.

7. The system according to claim 6 wherein the identifier is printed in a color associated with the profile.

\* \* \* \* \*